United States Patent [19]

Armbrecht et al.

[11] Patent Number: 4,485,042
[45] Date of Patent: Nov. 27, 1984

[54] DYESTUFF CONTAINING AT LEAST THREE AZO BRIDGES

[75] Inventors: Norbert Armbrecht, Sulzbach; Wolfgang Bauer, Maintal; Joachim Ribka, Offenbach-Bürgel, all of Fed. Rep. of Germany

[73] Assignee: Cassella Aktiengesellschaft, Frankfurt am Main, Fed. Rep. of Germany

[21] Appl. No.: 409,958

[22] Filed: Aug. 20, 1982

[30] Foreign Application Priority Data

Aug. 28, 1981 [DE] Fed. Rep. of Germany ....... 3134063

[51] Int. Cl.³ .................... C09B 29/045; C09B 31/18; C09B 33/22; C09B 35/24
[52] U.S. Cl. ...................................... 534/796; 8/641; 534/806; 534/810; 534/811; 534/815
[58] Field of Search .............. 260/169, 172, 158, 170, 260/171, 173; 8/641

[56] References Cited

U.S. PATENT DOCUMENTS

| | | | |
|---|---|---|---|
| 536,431 | 3/1895 | Kahn et al. | 260/169 |
| 671,543 | 4/1901 | Elbel et al. | 260/169 |
| 1,602,991 | 10/1926 | Schweitzer et al. | 260/169 |
| 2,094,845 | 10/1937 | Krzikalla et al. | 260/169 X |
| 2,750,375 | 6/1956 | Siebert et al. | 260/169 X |
| 2,758,109 | 8/1956 | Huss et al. | 260/169 |
| 2,833,756 | 5/1958 | Fleischhauer | 260/171 |
| 2,885,390 | 5/1959 | Huss et al. | 260/169 X |
| 2,885,391 | 5/1959 | Huss et al. | 260/169 X |

*Primary Examiner*—Floyd D. Higel
*Attorney, Agent, or Firm*—Connolly and Hutz

[57] ABSTRACT

Leathers can be advantageously dyed with water-soluble polyazo dyestuffs having, in the form of the free acid, the formula

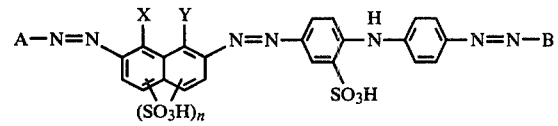

wherein
A is a member of the benzene, naphthalene or heterocyclic series;
B has the formula

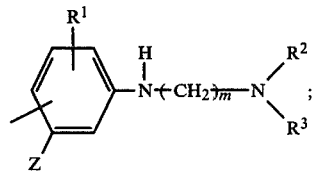

n is the number 1 or 2;
m is a number from 1 to 4;
X is hydroxyl or amino;
Y is hydroxyl or amino but X differs from Y;
Z is hydroxyl or amino unsubstituted or substituted by alkyl having 1 to 4 carbon atoms, alkanoyl having 1 to 4 carbon atoms or by a moiety of the formula

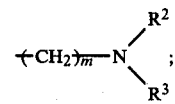

$R^1$ is hydrogen, alkyl having 1 to 4 carbon atoms, alkoxy having 1 to 4 carbon atoms or alkoxyalkoxy having 3 to 7 carbon atoms; and
$R^2$ and $R^3$ independently of one another are each hydrogen or alkyl having 1 to 4 carbon atoms.

7 Claims, No Drawings

DYESTUFF CONTAINING AT LEAST THREE AZO BRIDGES

The present invention relates to water-soluble polyazo dyestuffs which, in the form of the free acid, correspond to the formula I

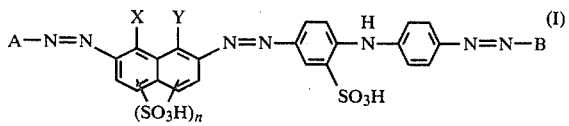

wherein
A denotes the radical of a diazo component of the benzene, naphthalene or heterocyclic series, B denotes the radical of a coupling component of the formula II

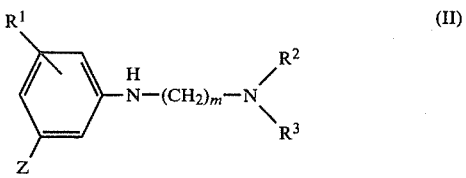

n denotes the number 1 or 2, m denotes a number from 1 to 4, X denotes a hydroxyl or amino group and Y denotes a hydroxyl or amino group but X differs from Y, Z denotes hydroxyl or an amino group which is optionally substituted by alkyl or alkanoyl with in each case 1 to 4 C atoms or by a radical of the formula

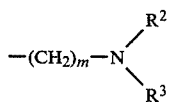

$R^1$ denotes hydrogen, alkyl with 1–4 C atoms, alkoxy with 1–4 C atoms or alkoxyalkoxy with 3 to 7 C atoms and $R^2$ and $R^3$ independently of one another denote hydrogen or alkyl with 4 C atoms, their preparation and their use for dyeing leather.

The radicals A are preferably derived from diazo components of the benzene series, but diazo components of the naphthalene series or heterocyclic diazo components, for example of the benzothiazole series, can also be employed. The radicals A of diazo components of the benzene series can be unsubstituted or monosubstituted or polysubstituted by the following substituents: halogen, in particular chlorine or bromine, alkyl with 1 to 4 C atoms, alkoxy with 1 to 4 C atoms, cyano, nitro, carboxyl, sulpho, amidocarbonyl, amidosulphonyl and phenylazo radicals in which the phenyl radical can in turn be optionally monosubstituted or polysubstituted by the following substitutents: halogen, in particular chlorine or bromine, alkyl with 1 to 4 C atoms, alkoxy with 1 to 4 C atoms, cyano, carboxyl, sulpho, amidocarbonyl and amidosulphonyl.

In the context of the present invention, polysubstitution is as rule to be understood as disubstitution or trisubstitution.

A radical A of a diazo component of the benzene series is, in particular, a phenyl nucleus which either is unsubstituted or carries a —COOH or —SO₃H group, a phenylazo group or a phenylamino group, optionally in combination with one or two alkyl or alkoxy groups or a cyano or nitro group or a halogen atom, or carries at most two, but preferably only one, cyano, nitro, amidocarbonyl or amidosulphonyl groups, or carries up to three, preferably one or two, substituents from the group comprising halogen atoms, alkyl and alkoxy.

Particularly preferred radicals A of diazo components of the benzene series are those in which the phenyl nucleus is either unsubstituted or substituted or a sulpho or carboxyl group or a phenylazo group, optionally in combination with a methyl or methoxy group or a chlorine atom, or by a nitro, cyano, amidocarbonyl or amidosulphonyl group, or by a chlorine or bromine atom, one or two methyl groups, one or two methoxy groups or one methyl and in addition one methoxy group.

If the substituted phenyl nucleus A carries a phenylazo or phenylamino group, the phenyl nucleus thereof can in turn be substituted in the same manner as described above for the phenyl nucleus A itself, with the exception that the phenyl nucleus of the phenylazo or phenylamino group cannot in turn carry a phenylazo or phenylamino group.

Preferably, however, a phenyl nucleus A substituted by phenylazo carries no further substitutents and the phenyl nucleus of the phenylazo or phenylamino group is in turn only monosubstituted by a sulpho or nitro group or disubstituted by a combination of a sulpho and nitro group.

A radical A of a diazo component of the naphthalene series is, in particular, a naphth-1-yl or naphth-2-yl nucleus which either is unsubstituted or carries one or two, preferably one, —COOH or —SO₃H group, the nucleus optionally additionally carrying, in addition to a single one of these groups, one or two, preferably one, alkyl or alkoxy group or a cyano or nitro group or a halogen atoms, or carries at most two, but preferably only one, cyano, nitro, amidocarbonyl or amidosulphonyl group, or carries up to three, preferably one or two, substituents from the group comprising halogen atoms, alkyl and alkoxy.

Particularly preferred radicals A of diazo components of the napthalene series are those in which the naphthyl nucleus is either unsubstituted or substituted by one or two sulpho or carboxyl groups or by a sulpho or carboxyl group in combination with a methyl, methoxy or nitro group or a chlorine atom, or by a nitro, cyano, methyl, methoxy, amidocarbonyl or amidosulphonyl group or by a chlorine or bromine atom.

A radical A of a diazo component of the heterocyclic series is, in particular, the 4-(benzothiazol-2-yl)-phenyl radical, which can be unsubstituted, monosubstituted by an alkyl group with 1 to 4 C atoms, preferably a methyl group, or by a sulpho group or disubstituted by a combination of such an alkyl group and a sulpho group.

The amino group symbolised by Z can be monosubstituted or disubstituted by alkyl groups with 1 to 4 C atoms, preferably by methyl, or monosubstituted by a group of the formula

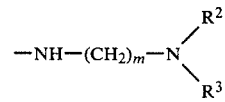

or by alkanoyl, preferably acetyl, or it can carry an alkyl and, in addition, an alkanoyl group of the chain length defined above. Z is particularly preferably —NH₂.

Mixtures of dyestuffs according to the invention in which Z is an NH₂ group with up to 50% by weight, preferably with up to 20% by weight, of dyestuffs according to the invention in which Z is a group of the formula

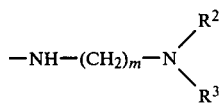

also offer very valuable technological properties and particular preparation advantages.

Polyazo dyestuffs according to the invention which, in the form of their free acids, correspond to the formula III

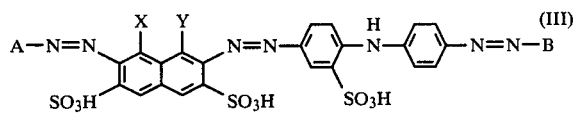

wherein A denotes the radical of a diazo component of the benzene series, X denotes a hydroxyl or amino group and Y denotes a hydroxyl or amino group, but X differs from Y, and B has the meaning already given, are particularly preferred.

Preferred radicals B are derived from coupling components of the formula II

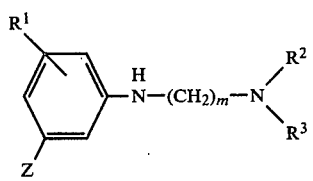

wherein Z denotes a methylamino, ethylamino, formylamino or acetylamino group, a group of the formula

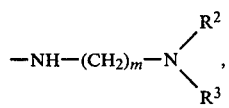

but, in particular, an —OH or —NH₂ group, R¹ denotes hydrogen, alkyl with 1 to 4 C atoms, methoxy, ethoxy or methoxyethoxy, especially hydrogen or methyl, R² and R³ independently of one another denote hydrogen, methyl or ethyl and m denotes the number 2 or 3.

In the context of the present invention, those polyazo dyestuffs of the formula I in which X is OH and Y is NH₂ are particularly preferred.

Those dyestuffs according to the invention which have several preferred features in their molecule are also particularly preferred.

The dyestuffs of the formula I according to the invention are prepared by a process in which a diazonium-disazo dyestuff of the formula IV

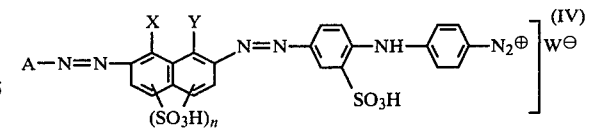

wherein A, X, Y and n have the abovementioned meanings and W⊖ is the anion of a mineral acid, is coupled to a compound of the formula II

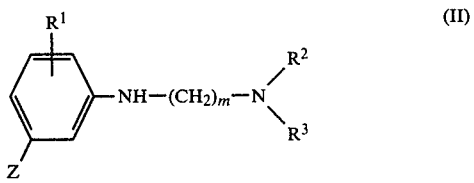

wherein Z, R¹, R², R³ and m have the abovementioned meanings, in a manner which is known per se.

Coupling reactions such as the above are usually carried out in an essentially aqueous medium. In addition to the reactants, organic solvents which are completely water-miscible or water-miscible to a limited extent can also be present. Thus, for example, the reaction can also advantageously be carried out in two-phase systems, such as the n-butanol/water system. Moreover, coupling accelerators, such as, for example, pyridine or dimethylformamide, and pH-regulating substances may be added. The pH value of the system is as a rule brought to values <7, preferably to between 3 and 6, and the temperature is kept at 0° to 50° C., preferably 10°–30° C.

The diazonium-disazo dyestuffs of the formula IV can also be prepared in a manner which is known per se, on the basis of diazotisation and coupling reactions which are known per se.

If preferred dyestuffs according to the invention in which X is a hydroxyl group and Y is an —NH₂ group are to be prepared, 4,4'-diamino-diphenylamine-2'-sulphonic acid is first tetrazotised in a manner which is known per se, for example by reaction with sodium nitrite in an acid aqueous medium, to prepare the corresponding starting compound of the formula IV, and the resulting tetrazo compound is coupled to an amino-naphthol-sulphonic acid of the formula V

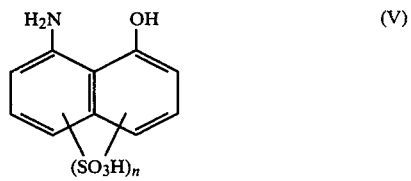

in a weakly acid range. A diazonium-monoazo dyestuff of the formula VI

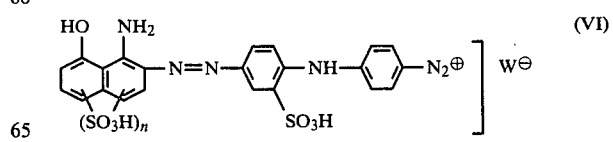

is then obtained, and is in turn coupled, in a weakly alkaline range, with a diazonium compound of the formula $A-N_2^{\oplus}$ which has been obtained in a known manner by diazotisation of an amine of the formula $A-NH_2$. The desired intermediate product of the formula IV wherein X is —OH and Y is —NH$_2$ is obtained in this manner.

In contrast, if dyestuffs of the formula I according to the invention in which X is an —NH$_2$ group and Y is the hydroxyl group are to be prepared, a diazonium compound of the formula $A-N_2^{\oplus}$ which has been obtained in a known manner by diazotisation of an amine of the formula $A-NH_2$ is first coupled, in a weakly acid pH-range to an amino-naphthol-sulphonic acid of the formula V

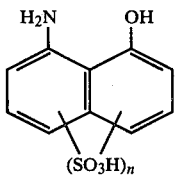
(V)

A monoazo dyestuff of the formula VII

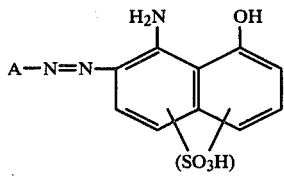
(VII)

is then obtained, to which the tetrazonium compound which can be prepared from 4,4'-diamino-diphenylamine-2'-sulphonic acid by diazotisation in a manner which is known per se is then coupled in a weakly alkaline range.

The intermediate product of the formula IV in which X is —NH$_2$ and —OH is thereby obtained.

The coupling components of the general formula II are prepared in a manner which is known per se, for example by reacting an aniline derivative of the formula

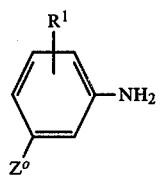

wherein Z° denotes hydroxyl or an amino group which is optionally substituted by alkyl or alkanoyl with in each case 1 to 4 C atoms, with a halogeno-amino-alkane of the formula

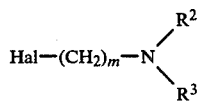

wherein Hal is a halogen atom, preferably chlorine or bromine, in water or an inert organic, preferably water-miscible, solvent in a molar ratio of 1:1 to 1:3. The reaction is usually carried out at weakly acid pH values, for example between pH 4 and 6.5, and at elevated temperature, for example at 80° to 100° C. (Cf. (Cf. Beilstein volume 12, EII, page 287; German Reichspatent 488,945; Frdl. volume 16, page 2696 and Beilstein volume 13, EII, page 28; German Reichspatent 488,890; Frdl. volume 16, page 2703 and Beilstein volume 13 EIII, page 91; F. G. Mann, F. T. Naylor and J. W. G. Porter, Jour. Chem. Cos., London (1974), page 914).

Examples of suitable amines of the formula A-NH$_2$ are: aniline, 2-, 3- and 4-chloroaniline, 2-, 3- and 4-methylaniline, 2-, 3- and 4-methoxyaniline, 2-, 3- and 4-ethoxyaniline, 2-methoxy-5-methylaniline, 2-, 3- and 4-nitroaniline, 2-chloro-4-nitroaniline, 4-aminobenzoic acid, 2-aminobenzoic acid, 2-, 3- and 4-aminobenzenesulphonic acid, 4-aminobenzoic acid amide, 4-aminobenzenesulphonic acid amide, 4-nitro-4'-aminodiphenylamine-2-sulphonic acid, 2,5-dichloroaniline, 1-aminonaphthalene, 1-aminonaphthalene-4-sulphonic acid, 2-aminophthalene-6-sulphonic acid, 2-aminonaphthalene-1-sulphonic acid, dehydrothiotoluidine, dehydrothiotoluidine-sulphonic acid, 4-aminoazobenzene and 4-aminoazobenzene-4'-sulphonic acid.

Examples of suitable aminonaphthol-sulphonic acids of the formula V are: 1-amino-8-hydroxy-naphthalene-4-sulphonic acid, 1-amino-8-hydroxy-naphthalene-3,6-disulphonic acid and 1-amino-8-hydroxy-naphthalene-4,6-disulphonic acid.

The dyestuffs according to the invention are outstandingly suitable for dyeing various types of leather (for example chrome side leather, boxcalf and split suide) and especially for dyeing synthetically vegetable-retanned types of leather. The polyazo dyestuffs of the general formula (I) can furthermore be used for dyeing cotton, polyamide, paper and wood. Dyeing is effected by known methods. Very level, deep dyeings with excellent fastness to light, fastness to solvents and fastness to wet processing, very good fastness to fat liquor and perspiration and very good resistance to water hardness, formaldehyde, formic acid and alkali are obtained with the dyestuffs according to the invention.

Compared with the nearest comparable dyestuffs, for example the dyestuffs described in German patent specification No. 943,662, German patent specification No. 1,046,221, German Offenlegungsschrift No. 2,254,835 and German Auslegeschrift No. 2,215,952, the dyestuffs according to the invention have surprising advantages, for example in tinctorial strength and in their fastness to wet processing on leather.

Furthermore, the dyestuffs according to the invention are substantially absorbed onto the leather, so that ecologically more favourable dyehouse effluents are obtained.

In the examples which follow, percentages denote percent by weight. The temperatures are given in degrees centigrade.

EXAMPLE 1

27.9 g of 4,4'-diaminodiphenylamine-2-sulphonic acid are tetrazotised in a mixture of 200 g of water and 50 g of 30% strength hydrochloric acid with a solution of 13.8 g of sodium nitrite in 50 g of water at 0°-5° C., with the addition of ice. After the sodium nitrite solution has been added, the mixture is subsequently stirred at 0°-5° C, for about 1½ hours, abnd the excess nitrous acid is then removed with amidosulphonic acid. 30 g of 1-amino-8-hydroxy-naphthalene-3,6-disulphonic acid are then dissolved in 100 g of water and 30% strength sodium hydroxide solution such that the solution has a pH value of 6.5 to 6.7. The neutral solution of the 1-amino- 8-hydroxy-naphthalene-3,6-disulphonic acid is then slowly added dropwise to the solution of the tetrazo component, which has been buffered to pH 2 with sodium acetate, and the one-sided coupling is brought to completion by stirring at 10° to 15° C. and adding sodium acetate until the pH value is 2.5.

A diazobenzene solution which has been prepared in a known manner from 8.54 g of aniline, 25 g of 30% strength hydrochloric acid and a solution of 6.3 g of sodium nitrite in 30 g of water at 0° C. is then added to the suspension of the diazotised monoazo dyestuff, which has been cooled to 0°–5° C. with ice, and the pH value is brought to 8.5–9 with 10% strength sodium carbonate solution.

A solution of 1-amino-3-(2'-diethylamino-ethylamino)-benzene which has been prepared by condensation of 10.8 g of 1,3-diaminobenzene with 17.2 g of diethylamino-ethyl chloride hydrochloride in 100 g of water at pH 5–6 and at 95°–100° C. is added to the resulting suspension of the blue diazotised disazo dyestuff. The coupling has ended after stirring at 15°–20° C. for about 3 hours. The dyestuff is precipitated by bringing the pH value to 2 and adding 100 g of sodium chloride.

The dyestuff, which, in the form of the free acid, has the formula

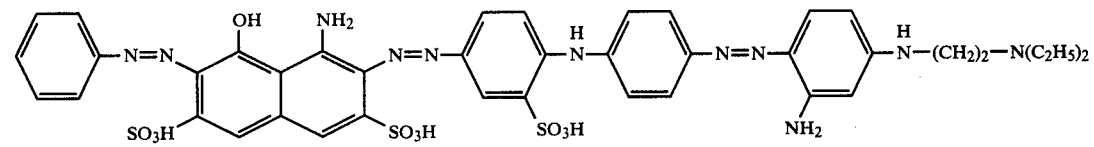

is filtered off and dried.
Yield: 152 g of a black powder.

Dyeing Example 1

100 g of synthetically vegetable-retanned cowhide (crust) are milled, in a dyeing vat at 50° C. for 45 minutes, in a dye liquor consisting of 3.75 g of the dyestuff obtained according to Example 1, 1,000 g of water and 1.5 g of an anionic fat liquoring agent. The dyestuff is then fixed with 3.7 g of 85% strength formic acid. The dyed leather is then rinsed and sammed. After drying at 60° C., a deep black dyeing with very good fastness properties, for example fastness to light and wet processing, is obtained.

EXAMPLE 2

27.9 g of 4,4'-diamino-diphenylamine-2-sulphonic acid are twetrazotised and coupled with 30 g of 1-amino-8-hydroxynaphthalene-3,6-disulphonic acid to give the diazotised monoazo dyestuff, as described in Example 1; coupling with the diazobenzene solution prepared from 8.54 g of aniline is then effected. The suspension of the blue diazotised disazo dyestuff is then combined with a solution of 1,3-bis-(2'-diethylaminoethylamino)-benzene which has been obtained by condensation of 20.7 g of 1-amino-3-(2'-diethylaminoethylamino)-benzene and 17.2 g of diethylaminoethyl chloride hydrochloride at pH 5–6 and at 95°–100° C. The dyestuff is isolated at pH 2, with the addition of 130 g of sodium chloride, and dried.

Yield: 170 g of a black powder.

A deep black dyeing with good fastness properties, for example good fastness to wet processing, is obtained on synthetically vegetable-retanned types of leather.

Table I shows the structural build-up of other dyestuffs prepared in a manner corresponding to that for the dyestuffs in Examples 1 and 2:

in column 1: the diazo component A—NH₂ used
in column 2: the 1-amino-8-hydroxynaphthalenesulphonic acid of the formula

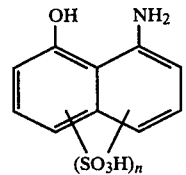

used, the number and positions of sulphonic acid groups being given in the table.
in column 3: the coupling component of the general formula II used
in column 4: the colour shade of the dyestuff on leather.

TABLE I

| Diazo component A—NH$_2$ | 1-Amino-8-hydroxy-naphthalene-sulphonic acid | Coupling component of the formula II | Colour shade on leather |
|---|---|---|---|
| Aniline | 3,6-Disulphonic acid | 1-Hydroxy-3-(3'-dimethylamino-propylamino)-benzene | black |
| Aniline | 3,6-Disulphonic acid | 1-Amino-3-(2'-dimethylaminoethyl-amino)-benzene | black |
| Aniline | 3,6-Disulphonic acid | 1-Hydroxy-3-(2'-dimethylamino-ethylamino)-benzene | black |
| Aniline | 3,6-Disulphonic acid | 1-Amino-3-(2'-diethylaminoethyl-amino)-6-methylbenzene | black |
| Aniline | 3,6-Disulphonic acid | 1-Hydroxy-3-(2'-aminoethylamino)-benzene | black |
| 4-Methoxyaniline | 3,6-Disulphonic acid | 1-Amino-3-(2'-diethylaminoethyl-amino)-benzene | black |
| 2-Methylaniline | 3,6-Disulphonic acid | 1-Amino-3-(2'-diethylaminoethyl-amino)-benzene | black |
| 2,5-Dimethylaniline | 3,6-Disulphonic acid | 1-Amino-3-(2'-diethylaminoethyl-amino)-benzene | black |
| 4-Amino-benzenesulphonic acid | 4-Sulphonic acid | 1-Amino-3-(2'-diethylaminoethyl-amino)-benzene | black |
| 4-Aminobenzoic acid | 3,6-Disulphonic acid | 1-Amino-3-(2'-diethylaminoethyl- | black |

TABLE I-continued

| Diazo component A—NH$_2$ | 1-Amino-8-hydroxy-naphthalene-sulphonic acid | Coupling component of the formula II | Colour shade on leather |
|---|---|---|---|
| 4-Chloroaniline | 3,6-Disulphonic acid | 1-Amino-3-(2'-diethylaminoethyl-amino)-benzene | black |
| 1-Aminonaphthalene-4-sulphonic acid | 3,6-Disulphonic acid | 1-Amino-3-(2'-diethylaminoethyl-amino)-benzene | black |
| Dehydrothiotoluidine-monosulphonic acid | 3,6-Disulphonic acid | 1-Amino-3-(2'-diethylaminoethyl-amino)-benzene | black |
| 4-Aminobenzene-4'-sulphonic acid | 3,6-Disulphonic acid | 1-Amino-3-(2'-diethylaminoethyl-amino)-benzene | black |
| Aniline | 4,6-Disulphonic acid | 1-Amino-3-(2'-diethylaminoethyl-amino)-benzene | black |
| Aniline | 3,6-Disulphonic acid | 1-Amino-3-(2'-diethylaminoethyl-amino)-benzene + 1,3-bis-(2'-diethyl-aminoethylamino)-benzene (molar ratio 4:1) | black |
| Aniline | 3,6-Disulphonic acid | 1-Amino-3-(2'-aminoethylamino)-benzene | black |
| Aniline | 3,6-Disulphonic acid | Condensation product of 2,4-diamino-anisole and diethylaminoethyl chloride (molar ratio 1:1) | black |
| Aniline | 3,6-Disulphonic acid | Condensation product of 2,4-diamino-(2'-methoxyethoxy)-benzene and dimethylamino-ethyl chloride (molar ratio 1:1) | black |

EXAMPLE 3

A solution of 31.9 g of 1-amino-8-hydroxynaphthalene-3,6-disulphonic acid in 100 parts of water which has been brought to pH 6 with sodium carbonate is added, at 0° C. to a 4-nitro-diazobenzene solution which has been prepared by a known method from 14.8 g of 1-amino-4-nitrobenzene, 30 g of 30% strength aqueous hydrochloric acid and a solution of 7.6 g of sodium nitrite in 30 g of water at 0° C.

When the coupling has ended, the tetrazo compound solution prepared by tetrazotisation of 27.9 g of 4,4'-diaminodiphenylamino-2-2-sulphonic acid with 13.8 g of sodium nitrite in a mixture of 50 prts of 30% strength aqueous hydrochloric acid and 200 g of water at 0°-5° C., with the addition of ice, is added to the suspension of the resulting red monoazo dyestuff.

The pH value is then brought to 7.5 in the course of ½ hour with a 10% strength sodium carbonate solution, which has been cooled to 5° C.

Thereafter, the one-sided coupling reaction has ended after a few minutes, after which a solution of 1-hydroxy-3-(2'-diethylaminoethylamino)-benzene prepared from 10.9 g of 3-aminophenol and 17.2 g of diethylaminoethyl chloride hydrochloride in 100 g of water at pH 5-6 and at 95°-100° C. is added to the mixture. The mixture is subsequently stirred for about 3 hours.

After the pH value has been brought to 2 and 100 g of sodium chloride have been added, the black dyestuff of the formula

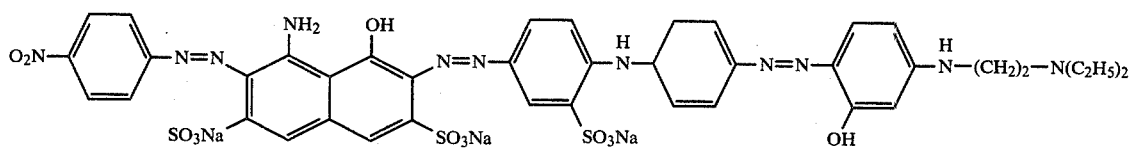

is isolated and dried.

Yield: 165 g of black powder.

Table II gives other dyestuffs which can be built up in a manner corresponding to the preparation process described in Example 2 and which are outstandingly suitable for dyeing leather.

TABLE II

| Diazo component A—NH$_2$ | 1-Amino-8-hydroxy-naphthalene-sulphonic acid | Coupling component of the formula II | Colour shade on leather |
|---|---|---|---|
| 2-Nitroaniline | 3,6-Disulphonic acid | 1-Amino-3-(2'-diethylamino-ethylamino)-benzene | black |
| 2,5-Dichloroaniline | 3,6-Disulphonic acid | 1-Amino-3-(2'-diethylamino-ethylamino)-benzene | black |
| 2-Chloroaniline | 3,6-Disulphonic acid | 1-Amino-3-(2'-diethylamino-ethylamino)-benzene | black |
| 4-Chloroaniline | 3,6-Disulphonic acid | 1-Amino-3-(2'-diethylamino-ethylamino)-benzene | black |

What is claimed is:

1. Water-soluble polyazo dyestuff having, in the form of the free acid, the formula

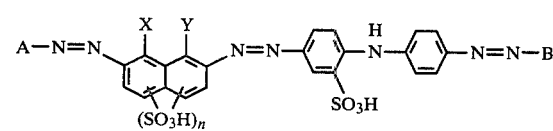

wherein

A is phenyl, naphth-1-yl or naphth-2-yl each of which is unsubstituted or substituted by halogen, alkyl having 1 to 4 carbon atoms, alkoxy having 1 to 4 carbon atoms, cyano, nitro, carboxyl, sulpho, amidocarbonyl, amidosulphonyl, or phenyl azo or A is a 4-(benzothiazol-2-yl)-phenyl which is unsubstituted or substituted by alkyl having 1 to 4 carbon atoms or sulpho;

B has the formula

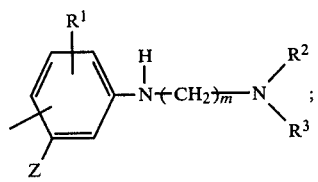

n is the number 1 or 2;
m is a number from 1 to 4;
X is hydroxyl or amino;
Y is hydroxyl or amino but X differs from Y;
Z is hydroxyl or amino unsubstituted or substituted by alkyl having 1 to 4 carbon atoms, alkanoyl having 1 to 4 carbon atoms or by a moiety of the formula

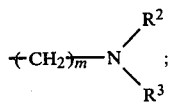

$R^1$ is hydrogen, alkyl having 1 to 4 carbon atoms, alkoxy having 1 to 4 carbon atoms or alkoxyalkoxy having 3 to 7 carbon atoms; and
$R^2$ and $R^3$ independently of one another are each hydrogen or alkyl having 1 to 4 carbon atoms.

2. Water-soluble polyazo dyestuff as claimed in claim 1, having in the form of their free acids the formula

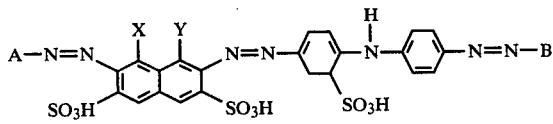

3. Water-soluble polyazo dyestuff according to claim 1 or claim 2 wherein A is phenyl or substituted phenyl monosubstituted or polysubstituted by substituents selected from halogen, alkyl having 1 to 4 carbon atoms, alkoxy having 1 to 4 carbon atoms, cyano, nitro, carboxyl, sulpho, amidocarbonyl, amidosulphonyl and phenylazo in which the phenylazo is unsubstituted or substituted by at least one halogen, alkyl having 1 to b 4 carbon atoms, alkoxy having 1 to 4 carbon atoms, cyano, carboxyl, sulpho, amidocarbonyl or amidosulphonyl.

4. Water-soluble polyazo dyestuff according to claim 1 or claim 2 wherein A is naphth-1-yl or naphth-2-yl each of which is (a) unsubstituted, (b) substituted by one or two of —COOH or —SO$_3$H, c) substituted by one of —COOH or —SO$_3$H and additionally an alkyl having 1 to 4 carbon atoms, alkoxy having 1 to 4 carbon atoms, cyano, nitro or halogen or (d) substituted by cyano, nitro, amidocarbonyl, amidosulphonyl, halogen, alkyl having 1 to 4 carbon atoms or alkoxy having 1 to 4 carbon atoms.

5. Water-soluble polyazo dyestuff according to claim 1 or claim 2 wherein A is a 4-(benzothiazol-2-yl)-phenyl which is unsubstituted, monosubstituted by alkyl having 1 to 4 carbon atoms or by a sulpho moiety, or disubstituted by a combination of said alkyl and said sulpho.

6. Water-soluble polyazo dyestuff according to claim 1 or claim 2 wherein B is derived from a coupling component of the formula

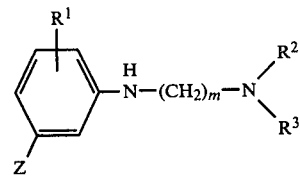

wherein
Z is —OH, —NH$_2$, methylamino, ethylamino, formylamino, acetylamino, or a moiety of the formula

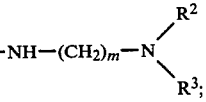

$R^1$ is hydrogen, alkyl having 1 to 4 carbon atoms, methoxy, ethoxy or methoxyethoxy;
$R^2$ and $R^3$ independently of one another are each hydrogen, methyl or ethyl; and
m is the number 2 or 3.

7. Water-soluble polyazo dyestuff according to claim 1 comprising a mixture of the dyestuffs wherein Z is NH$_2$, with up to 50% by weight of the dyestuffs wherein Z is NH$_2$ substituted by a moiety of the formula

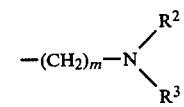

* * * * *